Patented Jan. 27, 1953

2,626,946

UNITED STATES PATENT OFFICE 2,626,946

POLYMERIZABLE AND POLYMERIZED ACRYLONITRILE COMPOSITIONS

John A. Price, Stamford, and Walter M. Thomas and John J. Padbury, Springdale, Conn., assignors to American Cyanamid Company, New York, N. Y., a corporation of Maine No Drawing. Application December 12, 1950, Serial No. 200,486

8 Claims. (Cl. 260—80.5)

This invention relates to new and useful compositions of matter, and more particularly is concerned with polymerizable and polymerized acrylonitrile compositions. Still more particularly the present invention is directed to polymerizable compositions comprising acrylonitrile and monoallyl amine (more commonly designated merely as "allyl amine"), the monoallyl amine constituting from about 1.5% to about 15% by weight of the total amount of monoallyl amine and acrylonitrile which is present in the said polymerizable composition; to products comprising such polymerized compositions, e. g., a copolymer of a mixture containing acrylonitrile and monoallyl amine in a weight ratio of from 90% (about 90%) to 98.5% (about 98.5%) of the former to from 1.5% (about 1.5%) to 10% (about 10%) of the latter (including a copolymer of mixed monomers consisting of from 2 to 10% by weight of monoallyl amine and the remainder acrylonitrile); and to methods of preparing such products. In the acrylonitrile polymerization products (copolymers) claimed in the present application, all of the nitrogen-containing radicals present therein are cyano and amino groups.

The present invention has, as one of its main objects, the production of new acrylonitrile copolymer compositions which are more readily dyed, especially with acid dyes, than homopolymeric acrylonitrile or many of the copolymers of acrylonitrile and another monomer or monomers that were known or suggested prior to our invention.

Another object of the invention is to prepare such copolymers which can be spun or otherwise shaped to form filaments, tapes, ribbons, tubes, rods, sheets, etc., and the shaped articles then dyed either before or after having been oriented or treated to improve their useful properties.

Other objects of the invention will be apparent to those skilled in the art from the description and examples which follow.

These objects are accomplished, in general, by preparing a copolymer of ingredients comprising acrylonitrile and monoallyl amine as briefly described in the first paragraph of this specification and more fully hereafter. The copolymer advantageously is produced, for instance, by polymerizing in an aqueous medium, with the aid of a polymerization catalyst (or catalysts), a mixture of comonomers including monoallyl amine and acrylonitrile, the monoallyl amine constituting from about 1.5% to about 15% by weight of the total amount of monoallyl amine and acrylonitrile employed; and, at the end of the polymerization period, isolating the resulting copolymer.

Any suitable means may be used in effecting copolymerization of the monoallyl amine with the acrylonitrile. Heat, light, or both heat and light, with or without a polymerization catalyst, can be used. A polymerization catalyst preferably is employed in order to shorten the period of time required for polymerization of the mixture of ingredients comprising acrylonitrile and monoallyl amine. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl)peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
tert.-Butyl diperphthalate
Cumene hydroperoxide
tert.-Butyl perbenzoate
2,4-dichlorobenzoyl peroxide
Urea peroxide
Caprylyl peroxide
p-Chlorobenzoyl peroxide
2,2-bis(tert.-butyl peroxy) butane
Hydroxyheptyl peroxide
Diperoxide of benzaldehyde Other so-called "free radical" types of catalysts, e. g., α,α'-azodiisobutyronitrile, also can be used to accelerate polymerization.

If desired, the mixture of monomers can be polymerized in emulsion or in solution state to yield a copolymer. Good results are obtained by effecting copolymerization while the monomers are dissolved in a suitable solvent, preferably water or a liquid solvent comprising mainly water. Suitable inert organic solvents also can be used if desired, e. g., benzene, toluene, xylene, etc. Preferably the copolymerization reaction is carried out in a liquid medium in which the monomeric mixture is soluble but the copolymer is insoluble, e. g., water.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e. g., from, by weight, about 1 part of catalyst per 1000 parts of the monomeric mixture to about 3 or 4 parts of catalyst per 100 parts of the mixture of monomers.

The temperature of polymerization of the polymerizable composition comprising acrylonitrile and monoallyl amine in the proportions specified in the first paragraph of this specification can be varied over a wide range, up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst, if any, used, the rapidity of polymerization wanted and other influencing factors. The use of polymerization temperatures substantially above the boiling point of the mixture of monomers is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

If desired, the monomers may be copolymerized in the presence of a plasticizer for the copolymer in a manner similar to that disclosed and claimed in the copending application of Walter M. Thomas, Serial No. 780,309, filed October 16, 1947, now Patent No. 2,558,396, dated June 26, 1951. Other copolymerization methods, however, also may be employed, e. g., methods such as those described in U. S. Patents 2,140,048, 2,160,054, 2,194,354, 2,333,635, 2,436,926, and British Patent 586,881, with reference to the production of other polymerization products. The copolymers of ingredients comprising combined acrylonitrile and monoallyl amine may be produced in various molecular weights, depending, for instance, upon the particular polymerization conditions employed but ordinarily are within the range of about 15,000 to about 300,000 or higher as calculated from viscosity measurements using the Staudinger equation (reference: U. S. Patent No. 2,404,713).

If the copolymerization reaction is carried out while the mixed monomers are dissolved or dispersed in a liquid medium, e. g., in solution in water, the resulting copolymer then is separated from the said medium by any suitable means, e. g., by filtration, centrifuging, solvent extraction, etc.

In order that those skilled in the art better may understand how the present invention can be carried into effect, the following examples are given by way of illustration and not by way of limitation. All parts and percentages are by weight.

*Example 1*

This example illustrates the preparation of homopolymeric acrylonitrile, which was subsequently employed in comparative tests with acrylonitrile-monoallyl amine copolymers of the present invention.

A reaction vessel, equipped with a stirrer, reflux condenser, thermometer and gas-inlet tube, was placed in a constant temperature bath which was maintained at 35° C. To the vessel was added a solution of 53.0 parts of acrylonitrile, 900 parts of distilled water and 0.029 part of sulfuric acid. A rapid stream of pre-purified nitrogen was passed over the surface of the solution for 30 minutes. The nitrogen flow was then reduced to about one bubble per second. A reduction-oxidation catalyst system ("redox" system) consisting of 1.71 parts of ammonium persulfate and 0.71 part of sodium meta-bisulfite, each dissolved in 50 parts of water, was then added. The solution first became cloudy at the end of 3 minutes, and the polymerization was fairly exothermic for the first half hour. The pH of the reaction product was 3.1. The polymer was collected on a Büchner funnel, washed with 1000 parts of distilled water followed by about 160 parts of methanol. The polymer was dried in an oven at 70° C. for about 16 hours. The yield of dry polyacrylonitrile, which was white, amounted to 48 parts.

*Example 2*

This example differs from Example 1 in that 2, 5, 10 and 15% of the acrylonitrile there employed was replaced, in a series of separate tests, with monoallyl amine, and the pH of the initial solutions was adjusted to 3.0–3.5 by the addition of 6 N sulfuric acid. The procedure otherwise was essentially the same as described in the prior example. Copolymers of acrylonitrile and monoallyl amine were obtained in amounts ranging from 24.5 to 44.5 parts of dry product, depending upon the percentage of monoallyl amine used in the mixture of monomers, as compared with the yield of 48 parts of dry polyacrylonitrile (homopolyacrylonitrile) obtained in Example 1.

Evidence of the fact that the monoallyl amine did not react with the acrylonitrile in the dilute aqueous acid solution to form β-allylaminopropionitrile was found by the results of the following test: Part (9.6%) of the acrylonitrile employed in Example 1 was replaced with β-allylaminopropionitrile. This percentage corresponds to 5% allyl (monoallyl) amine if the latter would react with acrylonitrile in dilute aqueous acid solution to form β-allylaminopropionitrile. When the resulting copolymer was subjected to a temperature of 150° C. for 2 hours, it charred. No charring occurred when the copolymer obtained by polymerization of a mixture of 95% acrylonitrile and 5% allyl amine was subjected to the same heat treatment at 150° C. for 2 hours, thus showing that the products are different in kind.

Example 3

A reaction vessel was charged with an emulsion consisting of 135 parts of acrylonitrile, 15 parts of monoallyl amine, 0.5 part of an emulsifying agent, more particularly a sodium sulfate of a long-chain aliphatic hydrocarbon, and 750 parts of distilled water. The pH of the initial emulsion was adjusted to 3.5 by the addition of 6 N sulfuric acid. A stream of nitrogen was passed over the surface of the emulsion for 30 minutes, after which the nitrogen flow was reduced to about one bubble per second. A reduction-oxidation catalyst system consisting of 1 part of ammonium persulfate and 0.492 part of potassium meta-bisulfite, each dissolved in 50 parts of water, was then added. The temperature was maintained at 35° C. At the end of 4 hours the emulsion was completely broken. The copolymer was collected on a Büchner funnel, washed with 2000 parts of water and then dried in an oven at 70° C. for about 16 hours. A white, dry copolymer of acrylonitrile and monoallyl amine was obtained in a yield amounting to 115 parts.

Example 4

Samples of the homopolymeric acrylonitrile of Example 1 and of the copolymers of Examples 2 and 3 (β-allylaminopropionitrile-acrylonitrile of Example 2 and monoallyl amine-acrylonitrile copolymer of Examples 2 and 3) were subjected to the following dye test:

A sample (10 parts) of the dry polymer or copolymer was added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath was boiled for 30 minutes, after which the polymerization product was filtered off and washed with hot water until the water was free of dye. The copolymers of Examples 2 and 3 were dyed blue, the intensity being directly proportional to the percentage of monoallyl amine used in forming the copolymer; that is, copolymers containing the higher content of monoallyl amine yielded the deeper dyeings. In marked contrast, the homopolymeric acrylonitrile of Example 1 failed to absorb any dye. The advantage of modifying an acrylonitrile polymerization product by replacing a part (e. g., from about 1.5% to 15% or more, still more particularly from 2 or 3% to 10 or 12%), of the initial acrylonitrile with monoallyl amine, thereby to obtain a copolymeric acrylonitrile substance of improved dyeability, is therefore quite apparent.

Example 5

A spinning solution was produced by dissolving 475 parts of an acrylonitrile-monoallyl amine copolymer (obtained by polymerizing a mixture of 95% acrylonitrile and 5% monoallyl amine as described under Example 2) in a concentrated aqueous solution of sodium thiocyanate (about 50% NaSCN in water). The copolymer had an average molecular weight of about 79,800, as calculated from viscosity measurements using the Staudinger equation. The resulting solution was placed under vacuum and allowed to deaerate for 20 hours, after which it was mechanically mixed for 4 hours. Thereafter the solution was filtered, followed by deaeration under vacuum for 14½ hours. The solution contained about 9.95% of copolymer. Its viscosity, as measured by the time required for a Monel ball (one-eighth inch in diameter and weighing 0.1418 gram) to fall through 20 cm. of solution at 61° C., was 40 seconds.

The solution was spun into a fiber by extruding it through a spinneret, having 40 holes 90 μ in diameter, into a coagulating bath comprising water maintained at a temperature of about 0° C. The spun fiber in gel state was continuously passed over a pair of converging wash rolls while it was advancing in a helical path. The fiber was rinsed with water on the rolls to remove excess thiocyanate. The washed fiber was stretched 650% by passing it through a bath of hot water maintained at a temperature of about 99.5° C., and then was taken up on bobbins where it was kept in a gelled state by applying a fine spray of water while the fiber was being collected on the bobbin. Additional information on the spinning conditions are given below:

Extrusion rate _____ cc. per minute__ 3.6
Temperature of the solution at the spinning head _____ degrees centigrade__ 94
Pullaway speed _____ meters per minute__ 7.0
Bobbin speed _____ do _____ 45.5
Calculated denier of the fiber _____ 105

The gelled fiber was dried and then dyed in the same manner as described under Example 4. The fiber was dyed to a deep shade of blue. In marked contrast, a fiber similarly prepared from homopolymeric acrylonitrile remained colorless when placed in the same dye bath for the same length of time.

Example 6

Same as in Example 2 with the exception that the comonomers named below, and in the percentage proportions there given, are used in forming three-component copolymers:

|  | Percent | | | | | | | |
| --- | --- | --- | --- | --- | --- | --- | --- | --- |
| Acrylonitrile | 97.0 | 97.0 | 95.0 | 95.0 | 90 | 90 | 85.0 | 85.0 |
| Allyl amine | 1.5 | 1.5 | 2.5 | 2.5 | 5 | 5 | 7.5 | 7.5 |
| Methyl acrylate | 1.5 | ---- | 2.5 | ---- | 5 | ---- | 7.5 | ---- |
| Acrylamide | ---- | 1.5 | ---- | 2.5 | ---- | 5 | ---- | 7.5 |

Similar results are obtained when these copolymers are subjected to tests for dyeability as described in Example 4.

Example 7

|  | Parts |
| --- | --- |
| Acrylonitrile | 90.0 |
| Monoallyl amine | 10.0 |
| α,α'-Azodiisobutyronitrile | 2.0 | were charged to a glass tube, and the tube was sealed without evacuating the air present therein. After thoroughly mixing the contents of the tube, it was placed in a water bath which was maintained at 40° C. After being maintained at this temperature for a total of 65 hours, a hard solid copolymer of acrylonitrile and monoallyl amine was obtained.

In marked contrast to the foregoing, when a mixture consisting of 10 parts monoallyl amine and 2.0 parts α,α'azodiisobutyronitrile was similarly heated in a sealed glass tube for 65 hours, the product was a slightly yellow, non-viscous liquid which gave no visual evidence that any polymerization had occurred. Evaporation of this liquid on a steam bath left a trace of a reddish brown liquid residue.

Example 8

|  | Parts |
| --- | --- |
| Acrylonitrile | 95.0 |
| Monoallyl amine | 5.0 |
| α,α'-Azodiisobutyronitrile | 2.0 |

The same procedure was followed as described under Example 7. In this case, too, a hard solid copolymer of the comonomers was obtained.

Example 9

| | Parts |
|---|---|
| Acrylonitrile | 85.0 |
| Monoallyl amine | 15.0 |
| α,α'-Azodiisobutyronitrile | 2.0 | were sealed in a glass tube, thoroughly mixed and copolymerized by immersing the tube in a 40° C. water bath as described in Examples 7 and 8. After 18 hours, about one-half of the contents of the tube (i. e., the mixed monomers in the tube) had copolymerized to form a solid white copolymer, some unpolymerized liquid being present above the solid copolymer. After a total of 42 hours' immersion in the water bath, the entire mass of monomers had copolymerized to form a hard, solid copolymer which was slightly yellow in color.

Example 10

| | Parts |
|---|---|
| Acrylonitrile | 180 |
| Monoallyl amine | 20 |
| α,α'-Azodiisobutyronitrile | 5 |
| Deoxygenated distilled water | 3000 |

The water was charged to a reaction vessel and heated to boiling while passing a vigorous stream of nitrogen gas over the surface of the water. Thereafter, the water was allowed to cool to 65° C. and the mixture of monoallyl amine and acrylonitrile was added, followed by the polymerization catalyst. The mixture was then heated to and maintained at 80° C. The liquid mass became turbid within 5 minutes after the monomeric mixture had been added. Heating was continued for 5 hours at 80° C. after which the reaction mass was allowed to stand at room temperature for about 16 hours. At the end of this period of time, most of the copolymer which formed had settled. The copolymer was a deep orange in color.

It will be understood, of course, by those skilled in the art that our invention is not limited to the specific ingredients named in the above illustrative examples nor to the particular proportions and methods of copolymerization mentioned therein. Thus, instead of α,α'-azodiisobutyronitrile and the reduction-oxidation (redox) catalyst system named in the different examples, any other polymerization catalyst or combination of polymerization catalysts, numerous examples of which have been given hereinbefore, can be used. Other catalysts and redox-catalyst systems that can be employed are given, for example, in the copending application of Arthur Cresswell, Serial No. 76,667, filed February 15, 1949, and in the various patents mentioned therein.

Likewise, other modifying comonomers, in addition to the methyl acrylate and acrylamide named in Example 6, can be used. Illustrative examples of such comonomers are vinyl compounds which are different from acrylonitrile (vinyl cyandide), including the vinyl aromatic compounds, more particularly the vinyl aromatic hydrocarbons (e. g., styrene, isopropenyl toluene, the various dialkyl styrenes, etc.); other aliphatic compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of any modifying comonomer or comonomers that are incorporated in the polymerizable composition together with the acrylonitrile and monoallyl amine can be varied as desired or as conditions may require. Ordinarily, however, the acrylonitrile constitutes a major or preponderant proportion (more than 50%) by weight of the total weight of monomers to be copolymerized, the monoallyl amine constitutes from about 1.5% to about 15% of the total weight of the acrylonitrile and monoallyl amine, and any modifying comonomer or comonomers (if present in the polymerizable mixture) constitute the remainder of the total amount of comonomers which are subjected to copolymerization.

In the preferred copolymer compositions (more particularly thermoplastic copolymer compositions) of the present invention, the acrylonitrile is employed in the mixture of comonomers in an amount such that at least 85% by weight of combined acrylonitrile is present in the copolymer. When the polymerization rates of the acrylonitrile and additional monomer or monomers are different from each other, then it may be necessary to start with an amount of acrylonitrile either more or less than 85% by weight of the total mixture of monomers in order that the final copolymer will contain at least 85% by weight of combined acrylonitrile in the copolymer molecule. Similarly, in order that the finished copolymer shall contain, in the copolymer molecule, from about 1.5% to about 15% by weight of combined monoallyl amine, preferably between about 2 or 3% and about 10% of combined monoallyl amine, it may be necessary to start with an amount of monoallyl amine either more or less than that which is present in the finished copolymer in order that the said copolymer will have the ultimate composition desired or required in order to impart optimum dye receptivity thereto.

Although the new copolymers of this invention are particularly useful in the formation of fibers or filaments which are more amenable to dyeing than homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of our invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from the copolymers of the present invention in the manner described in, for example, the copending application of Arthur Cresswell, Serial No. 76,668, filed February 15, 1949, with particular reference to the production of a molecularly oriented fiber from a copolymer of acrylonitrile and allyl alcohol. The unoriented and oriented fibers produced from our new copolymers are readily dyed, especially with an acid dye, while the fiber is in either a gel (e. g., aquagel) or a dry state.

We claim:

1. A polymerizable composition comprising monoallyl amine and acrylonitrile, the monoallyl amine constituting from about 1.5% to about 15% by weight of the total amount of monoallyl amine and acrylonitrile which is present in the said polymerizable composition.

2. A product comprising a copolymer of copolymerizable ingredients including acrylonitrile and monoallyl amine in a weight ratio of from about 85% to about 98.5% of the former to from about 1.5% to about 15% of the latter, all of the nitrogen-containing radicals in the said copolymer being cyano and amino radicals.

3. A copolymer of a mixture containing acrylonitrile and monoallyl amine in a weight ratio of from about 90% to about 98.5% of the former to from about 1.5% to about 10% of the latter, all of the nitrogen-containing radicals in the said copolymer being cyano and amino radicals.

4. The method of preparing a new copolymer which comprises polymerizing in an aqueous medium, with the aid of a polymerization catalyst, a mixture of comonomers including monoallyl amine and acrylonitrile, the monoallyl amine constituting from about 1.5% to about 15% by weight of the total amount of monoallyl amine and acrylonitrile, and isolating the resulting copolymer.

5. A copolymer of a mixture of copolymerizable ingredients including (1) acrylonitrile, (2) monoallyl amine and (3) an alkyl acrylate containing not more than four carbon atoms in the alkyl grouping thereof, the acrylonitrile constituting a preponderant proportion by weight of the total weight of copolymerizable ingredients in the said mixture and the monoallyl amine constituting from about 1.5% to about 15% of the total weight of the acrylonitrile and monoallyl amine in the said mixture, and all of the nitrogen-containing radicals in the said copolymer being cyano and amino radicals.

6. A copolymer as in claim 5 wherein the alkyl acrylate of (3) is methyl acrylate.

7. A copolymer of mixed monomers consisting of (1) acrylonitrile, (2) monoallyl amine and (3) methyl acrylate, the ingredients of (1) and (2) being present in a weight ratio of from about 85% to about 98.5% of the former to from about 1.5% to about 15% of the latter, and the methyl acrylate of (3) constituting the remainder.

8. A fiber formed of a copolymer of copolymerizable ingredients including acrylonitrile and monoallyl amine in a weight ratio of from about 85% to about 98.5% of the former to from about 1.5% to about 15% of the latter, all of the nitrogen-containing radicals in the said copolymer being cyano and amino radicals.

JOHN A. PRICE.
WALTER M. THOMAS.
JOHN J. PADBURY.

REFERENCES CITED

The following references are of record in the file of this patent:

UNITED STATES PATENTS

| Number | Name | Date |
| --- | --- | --- |
| 2,456,428 | Parker | Dec. 14, 1948 |